(12) United States Patent
Lethellier

(10) Patent No.: US 10,903,690 B2
(45) Date of Patent: Jan. 26, 2021

(54) CURRENT SHARING APPARATUS FOR WIRELESS POWER TRANSFER

(71) Applicant: Wireless Advanced Vehicle Electrification, Inc., Salt Lake City, UT (US)

(72) Inventor: Patrice Lethellier, Herriman, UT (US)

(*) Notice: Subject to any disclaimer, the term of this patent is extended or adjusted under 35 U.S.C. 154(b) by 204 days.

(21) Appl. No.: 16/150,165

(22) Filed: Oct. 2, 2018

(65) Prior Publication Data
US 2019/0103767 A1 Apr. 4, 2019

Related U.S. Application Data

(60) Provisional application No. 62/567,106, filed on Oct. 2, 2017.

(51) Int. Cl.

| | | |
|---|---|---|
| *H02J 50/12* | (2016.01) | |
| *H01F 38/14* | (2006.01) | |
| *H01F 27/24* | (2006.01) | |
| *H01F 27/255* | (2006.01) | |
| *H02J 50/80* | (2016.01) | |
| *H02J 7/02* | (2016.01) | |
| *H02J 50/90* | (2016.01) | |
| *B60L 53/12* | (2019.01) | |

(52) U.S. Cl.
CPC .............. *H02J 50/12* (2016.02); *H01F 27/24* (2013.01); *H01F 27/255* (2013.01); *H01F 38/14* (2013.01); *B60L 53/12* (2019.02); *H02J 7/025* (2013.01); *H02J 50/80* (2016.02); *H02J 50/90* (2016.02)

(58) Field of Classification Search
CPC .. H02J 50/12; H02J 50/80; H02J 50/90; H02J 7/025; H01F 27/24; H01F 27/255; H01F 38/14; B60L 53/12

USPC ........................................................ 307/104
See application file for complete search history.

(56) References Cited

U.S. PATENT DOCUMENTS

2015/0091517 A1  4/2015  Blum et al.
2016/0025821 A1  1/2016  Widmer et al.

FOREIGN PATENT DOCUMENTS

WO  2009081126 A1  7/2009

OTHER PUBLICATIONS

PCT/US2018054045, "Notification of Transmittal of the International Search Report and the Written Opinion of the International Searching Authority, or the Declaration", International Searching Authority, dated Jan. 17, 2019, pp. 1-7.

*Primary Examiner* — Hal Kaplan
(74) *Attorney, Agent, or Firm* — Kunzler Bean & Adamson; Bruce R. Needham

(57) ABSTRACT

An apparatus for current sharing for wireless power transfer is disclosed. The apparatus includes two or more power converter apparatuses. Each power converter apparatus is connected to a primary wireless power transfer pad. The apparatus includes one or more ferrite structures where each ferrite structure includes a conductor of at least one power converter apparatus of the two or more power converter apparatuses passing through the ferrite structure and each ferrite structure includes two or more conductors. The conductors passing through a ferrite structure of the one or more ferrite structures are arranged to maintain equal current sharing between the conductors passing through the ferrite structure.

20 Claims, 10 Drawing Sheets

US 10,903,690 B2

CURRENT SHARING APPARATUS FOR WIRELESS POWER TRANSFER

CROSS-REFERENCES TO RELATED APPLICATIONS

This application claims the benefit of U.S. Provisional Patent Application No. 62/567,106 entitled "CURRENT SHARING APPARATUS FOR WIRELESS POWER TRANSFER" and filed on Oct. 2, 2017 for Patrice Lethellier, which is incorporated herein by reference.

FIELD

This invention relates to wireless power transfer and more particularly relates to current sharing between devices for wireless power transfer.

BACKGROUND

As wireless power transfer ("WPT") technology increases, there is a need to increase the amount of power transferred wirelessly. Practical size and power limits of components and switching devices limit the amount of power that can be transferred without paralleling devices, such as resonant converters. However, paralleling can cause unequal sharing between devices, which can cause unequal wear and component failure.

SUMMARY

An apparatus for current sharing for wireless power transfer is disclosed. The apparatus includes two or more power converter apparatuses. Each power converter apparatus is connected to a primary wireless power transfer ("WPT") pad. The apparatus includes one or more ferrite structures where each ferrite structure includes a conductor of at least one power converter apparatus of the two or more power converter apparatuses passing through the ferrite structure and each ferrite structure includes two or more conductors. The conductors passing through a ferrite structure of the one or more ferrite structures are arranged to maintain equal current sharing between the conductors passing through the ferrite structure.

Another apparatus for current sharing for wireless power transfer includes two or more power converter apparatuses. Each power converter apparatus is connected to a primary WPT pad, and each converter apparatus includes a resonant converter and a switching section. The apparatus includes one or more ferrite structures. Each ferrite structure includes a conductor of at least one power converter apparatus of the two or more power converter apparatuses passing through the ferrite structure, where the conductors passing through a ferrite structure of the one or more ferrite structures are arranged to maintain equal current sharing between the conductors passing through the ferrite structure. Each ferrite structure of the one or more ferrite structures is a toroid, and the toroid includes a ferromagnetic material. At least one ferrite structure of the one or more ferrite structures includes conductors passing through the ferrite structure from two or more different power converter apparatuses and the conductors passing through the ferrite structure are arranged to maintain equal current sharing between the power converter apparatuses.

Another apparatus for current sharing for wireless power transfer includes two or more secondary circuits. Each secondary circuit includes rectifier section. Each secondary circuit is connected to a secondary WPT pad that receives power wirelessly. The apparatus includes one or more ferrite structures. Each ferrite structure includes a conductor of at least one secondary circuit of the two or more secondary circuits passing through the ferrite structure. The conductors passing through a ferrite structure of the one or more ferrite structures are arranged to maintain equal current sharing between the conductors passing through the ferrite structure.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
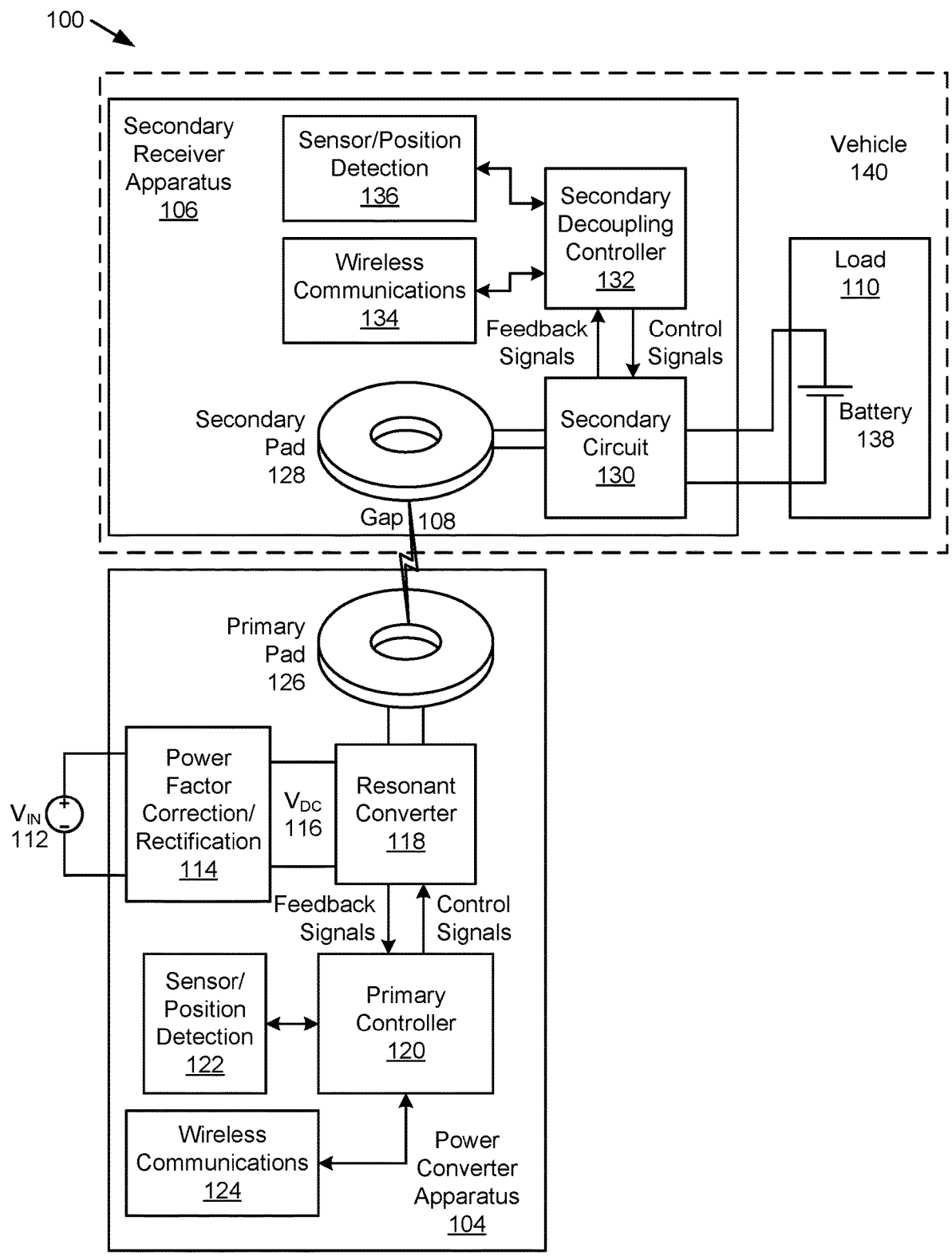
FIG. 1 is a schematic block diagram illustrating one embodiment of a system with a low voltage wireless power transfer ("WPT") pad.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

An apparatus for current sharing for wireless power transfer is disclosed. The apparatus includes two or more power converter apparatuses. Each power converter apparatus is connected to a primary wireless power transfer ("WPT") pad. The apparatus includes one or more ferrite structures where each ferrite structure includes a conductor of at least one power converter apparatus of the two or more power converter apparatuses passing through the ferrite structure and each ferrite structure includes two or more conductors. The conductors passing through a ferrite structure of the one or more ferrite structures are arranged to maintain equal current sharing between the conductors passing through the ferrite structure.

In some embodiments, a ferrite structure of the one or more ferrite structures and two or more conductors passing through the ferrite structure form a transformer. In other embodiments, each ferrite structure of the one or more ferrite structures includes a toroid where the toroid includes a ferromagnetic material. In other embodiments, the two or more power converter apparatuses include resonant converters and each resonant converter includes a switching section and a tuning section. A conductor in a current path common with the switching section and the tuning section of a resonant converter passes through a ferrite structure of the one or more ferrite structures. In further embodiments, each tuning section includes at least one inductor assembly with an inductance. The inductor assembly includes two or more inductors connected in parallel and the apparatus includes one or more current sharing ferrite structures for the inductor assembly. A conductor of each inductor passes through at least one of the current sharing ferrite structures of the inductor assembly in an arrangement to maintain equal current sharing between the inductors.

In some embodiments, the two or more power converter apparatuses include two power converter apparatuses and the one or more ferrite structures include one ferrite structure and a conductor of each of the power converter apparatuses passes through the ferrite structure in an arrangement to maintain equal current sharing between the power converter apparatuses. In other embodiments, the two or more power converter apparatuses comprise four power converter apparatuses and the one or more ferrite structures include four ferrite structures. A conductor of each of a first and a second power converter apparatus pass through a first ferrite structure, a conductor of each of the second and a third power converter apparatus pass through a second ferrite structure, a conductor of each of the third and a fourth power converter apparatus pass through a third ferrite structure and a conductor of each of the fourth and the first power converter apparatus pass through a fourth ferrite structure, where the conductors and ferrite structures are arranged to maintain equal current sharing between the four power converter apparatuses.

In some embodiments, the two or more power converter apparatuses include four power converter apparatuses and the one or more ferrite structures include three ferrite structures. A conductor of each of a first and a second power converter apparatus pass through a first ferrite structure, a conductor of each of a third and a fourth power converter apparatus pass through a second ferrite structure and a conductor of each of the first, the second, the third and the fourth power converter apparatus pass through a third ferrite structure, where the conductors and ferrite structures are arranged to maintain equal current sharing between the four power converter apparatuses.

In other embodiments, the apparatus includes an equal number of power converter apparatuses and ferrite structures and each of the two or more power converter apparatuses includes a conductor passing through a ferrite structure and the apparatus includes an additional conductor that passes through each ferrite structure of the two or more ferrite structures. The conductors of the two or more power converter apparatuses, the additional conductor and the ferrite structures are arranged to maintain equal current sharing between the two or more power converter apparatuses. In further embodiments, the additional conductor includes n turns around each of the ferrite structures and each conductor of the two or more power converter apparatuses passing through the ferrite structure includes m turns around the ferrite structure, where n is greater than m resulting in less current through the additional conductor than the currents of the conductor of the power converter apparatus passing through the ferrite structures.

In one embodiment, the primary WPT pad includes two or more windings arranged in parallel and the apparatus includes one or more current sharing ferrite structures in addition to a pad ferrite structure of the primary WPT pad. The one or more current sharing ferrite structures are arranged with at least one winding passing through each of the one or more current sharing ferrite structures to maintain equal current sharing between the windings. In other embodiments, the conductors passing through a ferrite structure of the one or more ferrite structures for equal power sharing each include an equal number of turns around the ferrite structure.

Another apparatus for current sharing for wireless power transfer includes two or more power converter apparatuses. Each power converter apparatus is connected to a primary WPT pad, and each converter apparatus includes a resonant converter and a switching section. The apparatus includes one or more ferrite structures. Each ferrite structure includes a conductor of at least one power converter apparatus of the two or more power converter apparatuses passing through the ferrite structure, where the conductors passing through a ferrite structure of the one or more ferrite structures are arranged to maintain equal current sharing between the conductors passing through the ferrite structure. Each ferrite structure of the one or more ferrite structures is a toroid, and the toroid includes a ferromagnetic material. At least one ferrite structure of the one or more ferrite structures includes conductors passing through the ferrite structure from two or more different power converter apparatuses and the conductors passing through the ferrite structure are arranged to maintain equal current sharing between the power converter apparatuses.

Another apparatus for current sharing for wireless power transfer includes two or more secondary circuits. Each secondary circuit includes rectifier section. Each secondary circuit is connected to a secondary WPT pad that receives power wirelessly. The apparatus includes one or more ferrite structures. Each ferrite structure includes a conductor of at least one secondary circuit of the two or more secondary circuits passing through the ferrite structure. The conductors passing through a ferrite structure of the one or more ferrite structures are arranged to maintain equal current sharing between the conductors passing through the ferrite structure.

In some embodiments, the two or more secondary circuits feed a common load. In other embodiments, a conductor of each of a first and a second secondary circuits of the two or more secondary circuits pass through a common ferrite structure. The conductors and ferrite structure are arranged to maintain equal current sharing between the first and the second secondary circuits. In other embodiments, each secondary circuit includes a tuning section connected to the rectifier section of the secondary circuit. Each tuning section of a secondary circuit is positioned between the rectifier section of the secondary circuit and the secondary WPT pad feeding the secondary circuit. A conductor of a current path between the WPT secondary pad feeding a secondary circuit and a tuning section of the secondary circuit passes through a ferrite structure of the one or more ferrite structures in an arrangement to maintain equal current sharing between the secondary circuits.

In some embodiments, the two or more secondary circuits include four secondary circuits and the one or more ferrite structures include four ferrite structures. A conductor of each of a first and a second secondary circuit pass through a first ferrite structure, a conductor of each of the second and a third secondary circuit pass through a second ferrite structure, a conductor of each of the third and a fourth secondary circuit pass through a third ferrite structure and a conductor of each of the fourth and the first secondary circuit pass through a fourth ferrite structure, where the conductors and ferrite structures are arranged to maintain equal current sharing between the four secondary circuits. In other embodiments, the two or more secondary circuits include four secondary circuits and the one or more ferrite structures include three ferrite structures. A conductor of each of a first and a second secondary circuit pass through a first ferrite structure, a conductor of each of a third and a fourth secondary circuit pass through a second ferrite structure and a conductor of each of the first, the second, the third and the fourth secondary circuit pass through a third ferrite structure, where the conductors and ferrite structures are arranged to maintain equal current sharing between the four secondary circuits. In other embodiments, the two or more secondary circuits include two secondary circuits and the one or more ferrite structures include one ferrite structure and a conductor of each of the secondary circuits passes through the ferrite structure in an arrangement to maintain equal current sharing between the secondary circuits.

FIG. 1 is a schematic block diagram illustrating one embodiment of a wireless power transfer ("WPT") system 100 with a low voltage WPT pad. The WPT system 100 includes a power converter apparatus 104 and a secondary receiver apparatus 106 separated by a gap 108, and a load 110, which are described below.

The WPT system 100 includes a power converter apparatus 104 that receives power from a power source 116 and transmits power over a gap 108 to a secondary receiver apparatus 106, which transfers power to a load 110. The power converter apparatus 104, in one embodiment, may be called a switching power converter and includes a resonant converter 118 that receives a direct current ("DC") voltage from a DC bus 116. In one embodiment, the power source 112 provides DC power to the DC bus 116. In another embodiment, the power source 112 is an alternating current ("AC") power source, for example from a building power system, from a utility, from a generator, etc. and the power converter apparatus 104 includes a form of rectification to provide DC power to the DC bus 116. For example, the rectification may be in the form of a power factor correction and rectification circuit 114. In the embodiment, the power factor correction and rectification circuit 114 may include an active power factor correction circuit, such as a switching power converter. The power factor correction and rectification circuit 114 may also include a fill-bridge, a half-bridge rectifier, or other rectification circuit that may include diodes, capacitors, surge suppression, etc.

The resonant converter 118 may be controlled by a primary controller 120, which may vary parameters within the resonant converter 118, such as conduction time, conduction angle, duty cycle, switching, etc. The primary controller 120 may receive information from sensors and position detection 122 and wireless communications 124 within or associated with the power converter apparatus 104. The primary controller 120 may also receive information wirelessly from the secondary receiver apparatus 106.

The power converter apparatus 104 includes a primary pad 126 (i.e. a primary WPT pad) that receives power from the resonant converter 118. In one embodiment, portions of the resonant converter 118 and primary pad 126 form a resonant circuit that enables efficient wireless power transfer across the gap 108. The gap 108, in some embodiments includes an air gap, but may also may partially or totally include other substances. For example, where the primary pad 126 is in a roadway, the gap 108 may include a resin, asphalt, concrete or other material just over the windings of the primary pad 126 in addition to air, snow, water, etc.

between the primary pad 126 and a secondary pad 128 located in the secondary receiver apparatus 106.

The secondary receiver apparatus 106 includes a secondary pad 128 (i.e. a secondary WPT pad) connected to a secondary circuit 130 that delivers power to the load 110. The secondary receiver apparatus 106 may also include a secondary decoupling controller 132 that controls the secondary circuit 130 and may also be in communication with sensors and/or position detection 136 and wireless communications 134 coupled to the power converter apparatus 104.

In one embodiment, the secondary receiver apparatus 106 and load 110 are part of a vehicle 140 that receives power from the power converter apparatus 104. The load 110 may include a battery 138, a motor, a resistive load, a circuit or other electrical load. For example, the WPT system 100 may transfer power to a portable computer, a consumer electronic device, to an industrial load, or other load that would benefit from receiving power wirelessly.

In one embodiment, the secondary circuit 130 includes a portion of resonant circuit that interacts with the secondary pad 128 and that is designed to receive power at a resonant frequency. The secondary circuit 130 may also include a rectification circuit, such as a fill-bridge rectifier, a half-bridge rectifier, and the like. In another embodiment, the secondary circuit 130 includes a power converter of some type that receives power from the resonant circuit/rectifier and actively controls power to the load 110. For example, the secondary circuit 130 may include a switching power converter. In another embodiment, the secondary circuit 130 includes passive components and power to the load 110 is controlled by adjusting power in the power converter apparatus 104. In another embodiment, the secondary circuit 130 includes an active rectifier circuit that may receive and transmit power. One of skill in the art will recognize other forms of a secondary circuit 130 appropriate for receiving power from the secondary pad 128 and delivering power to the load 110.

The resonant converter 118, in one embodiment, includes an active switching section coupled to a resonant circuit formed with components of the resonant converter 118 and the primary pad 126. The resonant converter 118 is described in more detail with regard to FIG. 2.

Figure 2:
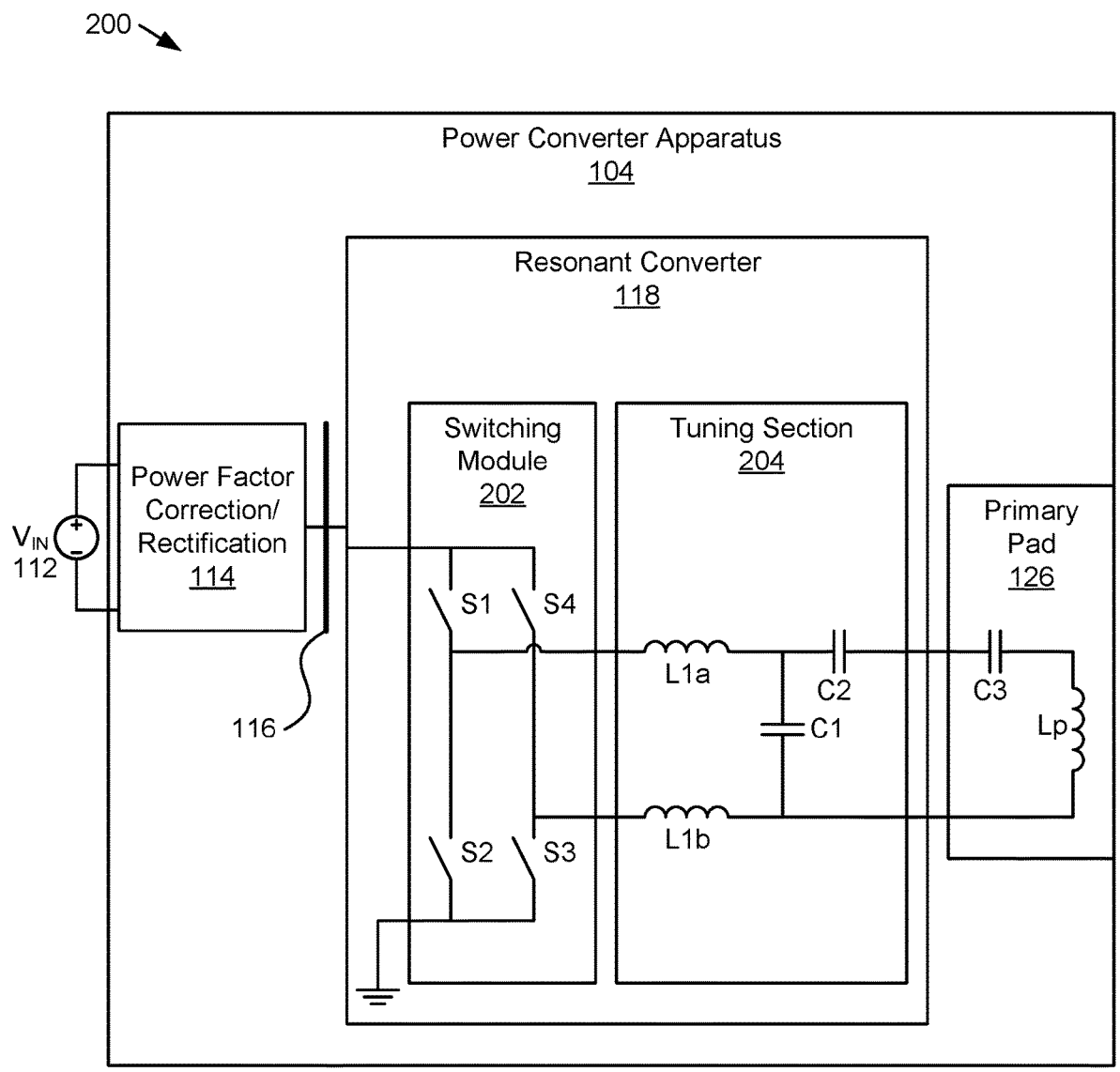
FIG. 2 is a schematic block diagram illustrating one embodiment of a power converter apparatus.

FIG. 2 is a schematic block diagram illustrating one embodiment 200 of a power converter apparatus 104. The power converter apparatus 104 is connected to a power source 112 and includes a power factor correction and rectification circuit 114 connected to a DC bus 116 feeding a resonant converter 118 connected to a primary pad 126 as described with regard to the WPT system 100 of FIG. 1.

The resonant converter 118 includes a switching module 202 and a tuning section 204. In one embodiment, the switching module 202 includes four switches configured to connect the DC bus 116 and to ground. Typically, switches S1 and S3 close while switches S2 and S4 are open and vice-versa. When switches S1 and S3 are closed, the DC bus 116 is connected to a positive connection of the tuning section 204 through inductor L1a and the ground is connected to the negative connection of the tuning section 204 through inductor L1b while switches S2 and S4 are open. When switches S2 and S4 are closed, the ground is connected to the positive terminal of the tuning section 204 and the DC bus 116 is connected to the positive connection of the tuning section 204. Thus, the switching module alternates connection of the DC bus 116 and ground to the tuning section simulating an AC waveform. The AC waveform is typically imperfect due to harmonics.

Typically, switches S1-S4 are semiconductor switches, such as a metal-oxide-semiconductor field-effect transistor ("MOSFET"), a junction gate field-effect transistor ("JFET"), a bipolar junction transistor ("BJT"), an insulated-gate bipolar transistor ("IGBT") or the like. Often the switches S1-S4 include a body diode that conducts when a negative voltage is applied. In some embodiments, the timing of opening and closing switches S1-S4 are varied to achieve various modes of operations, such as zero-voltage switching.

The tuning section 204 of the resonant converter 118 and the primary pad 126 are designed based on a chosen topology. For example, the resonant converter 118 and primary pad 126 may form an inductor-capacitor-inductor ("LCL") load resonant converter, a series resonant converter, a parallel resonant converter, and the like. The embodiment depicted in FIG. 2 includes an LCL load resonant converter.

Resonant converters include an inductance and capacitance that form a resonant frequency. When a switching frequency of the tuning section 204 is at or close to the resonant frequency, voltage with the tuning section 204 and primary pad 126 often increases to voltages levels higher than the voltage of the DC bus 116. For example, if the voltage of the DC bus 116 is 1 kilovolt ("kV"), voltage in the tuning section 204 and resonant converter 118 may be 3 kV or higher. The high voltages require component ratings, insulation ratings, etc. to be high enough for expected voltages.

The primary pad 126 includes capacitor C3 and inductor Lp while the tuning section 204 includes series capacitor C2. Capacitors C2 and C3 add to provide a particular capacitance that forms a resonant frequency with inductor Lp. In some embodiments, the power converter apparatus 104 includes a single series capacitor in the tuning section 204 or in the primary pad 126. While the FIG. 2 is focused on the resonant converter 118 and primary pad 126, the secondary receiver apparatus 106 includes a secondary pad 128 and a secondary circuit 130 that typically includes a tuning section where the inductance of the secondary pad 128 and capacitance of the tuning section of the secondary circuit 130 form a resonant frequency and the secondary pad 128 and secondary circuit 130 have voltage issues similar to the primary pad 126 and resonant converter 118.

A common method of increasing power to a load is to use parallel apparatuses or systems. For example, each power converter apparatus 104 may be limited in power production based on component availability, conductor size, etc. Providing some elements in parallel may increase power production, but may also present problems in terms of equal sharing between the paralleled elements. Often one or more elements will be at a maximum power level while others are producing less power. Typical solutions include active control schemes that attempt to regulate power in each element so that current sharing between elements is equal. However, active current sharing is often difficult and requires numerous components, sensors, etc.

Figure 3:
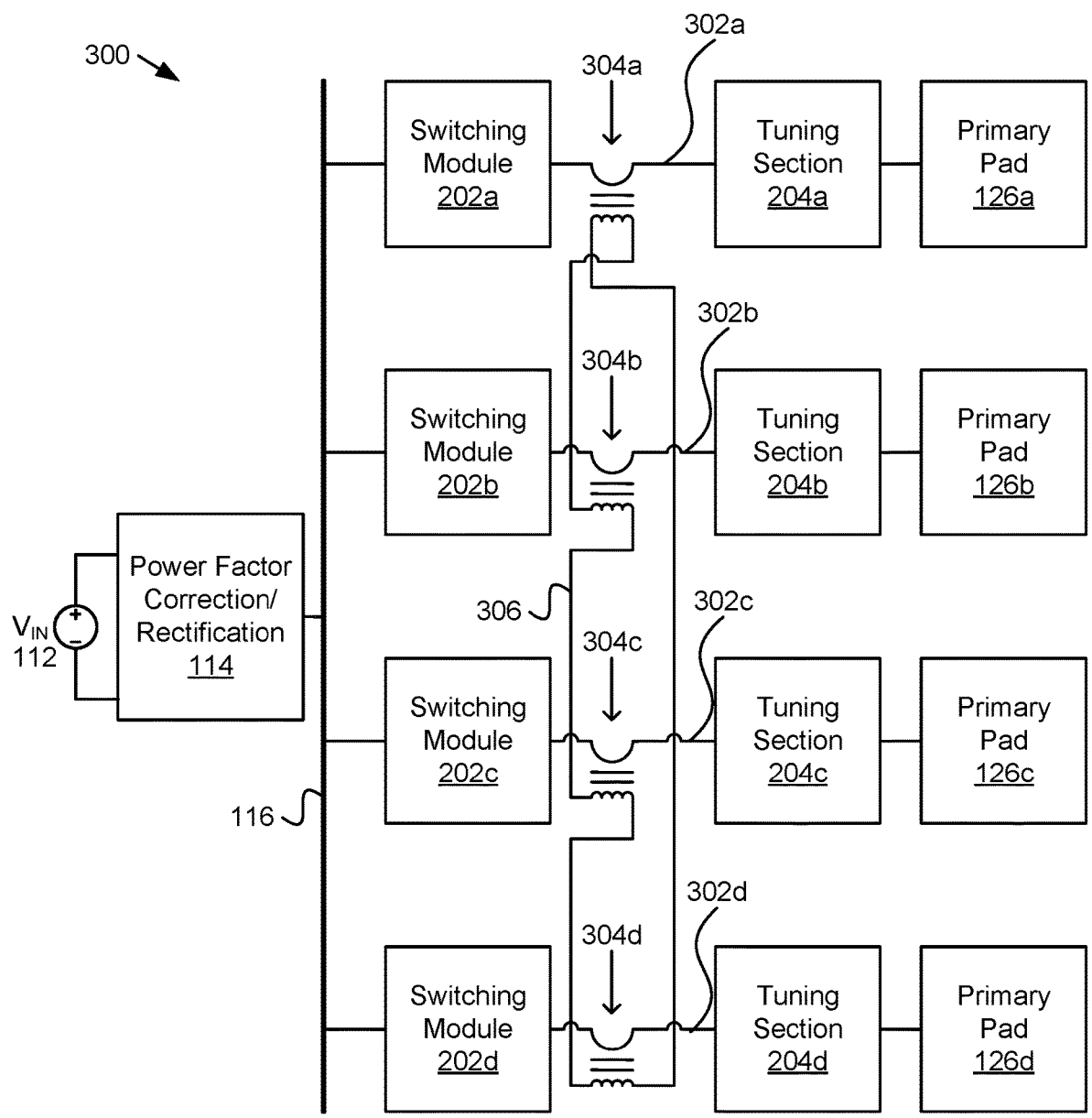
FIG. 3 is a schematic block diagram illustrating one embodiment of four resonant converters and primary pads in parallel with one embodiment of a current sharing apparatus with a conductor that connects four transformers.

FIG. 3 is a schematic block diagram illustrating one embodiment 300 of four resonant converters 118 and primary pads 126 in parallel with one embodiment of a current sharing apparatus with a conductor that connects four transformers. The switching modules 202a-d each feed a tuning section 204a-d, each of which is connected to a primary pad 126a-d.

While the resonant converters 118 are depicted feeding four separate primary pads 126a-d, in some embodiments the primary pads 126a-d may be interleaved to act as a single load or may be combined into a single primary pad 126, which may accentuate current sharing issues.

The DC bus 116, output of the power factor correction/rectification 114, switching modules 202a-d (generically or collectively "202"), tuning sections 204a-d (generically or collectively "204"), and primary pads 126a-d (generically or collectively "126") are depicted in a one-line diagram format with a single line running between each element. One of skill in the art will recognize that a one-line diagram is a short-hand notation where it is understood that each element has two or more power wires running between the elements. In the one-line diagram depicted in FIG. 3, the switching modules 202, tuning sections 204, and primary pads 126 each have at least the two conductors in and out as depicted in FIG. 2.

Each switching module 202a-d is connected to an associated tuning module 204a-d via a conductor 302a-d (generically or collectively "302") and includes a transformer 304a-d (generically or collectively "304"). The conductor 302 may in either the line or return conductors. If the line conductors are used (i.e. the top conductor between the switching module 202 and the tuning section 204 in FIG. 2), the line conductor would typically be used for all conductors 302. Alternatively, the return conductors could be used, but typically the selection of line or return conductor is consistent throughout the paralleled resonant converters 118 and primary pads 126.

The transformer 304, in one embodiment, is a current transformer with a ferrite structure or magnetic core, such as a toroid, with the conductor 302 passing through the middle of the ferrite structure. In one embodiment, the conductor 302 passes through the ferrite structure without wrapping around a portion of the transformer, thus forming one winding. A conductor passing through a ferrite structure, such as a toroid is a common way to form a current transformer. Typically, a toroid includes a ferromagnetic material suitable for generating a magnetic flux due to current in the conductor(s). Often a secondary winding will be wound around the ferrite structure "n" times forming a 1:n current ratio between the current in the conductor passing through the ferrite structure once and the conductor of the secondary winding. In other embodiments, the conductor 302 is wound through the ferrite structure "n" times so there are "n" windings.

The transformer 304 transfers electrical energy between two or more circuits through electromagnetic induction. A varying current in a primary winding, such as the conductor 302 produces a varying magnetic field in a ferrite structure of the transformer 304. The varying magnetic field in the ferrite structure affects current in a secondary winding. The ferrite structure may be a toroid or other ferromagnetic structure. In an ideal transformer, coupling is perfect and the transformer appears as merely an ideal voltage or current transformation related by a ratio of the number of primary windings to the number of secondary windings.

However, transformers are not ideal and include leakage inductance, magnetizing inductance, resistance of the conductors, etc. In addition, coupling between the windings and the ferrite structure is not ideal and the structure of the transformer dictates the coupling and may be expressed as a coupling coefficient. The ferrite structure typically presents a significant amount of inductance so that the conductor 302 includes a series inductor that is not insignificant.

On a typical two winding transformer with a primary winding with two connections and a secondary winding with two connections, the transformer is typically marked with a dot on one side of the primary winding and a dot on one side of the secondary winding. The dots indicate typical current flow. Due to magnetic coupling and the inductance of the transformer, if current is flowing into the primary winding at the dot, current will flow out of the secondary winding at the conductor with the second dot at a magnitude related by the turns ratio of the transformer. Any current deviation will cause voltages across the windings that will resist the current deviation.

For the transformers 304 depicted in FIG. 3, current in a first conductor 302a will produce a current in a current loop 306 connected to the first transformer 304a and the current in the conductor of the current loop 306 will affect each of the other transformers 304b-d, which in turn affects current in the conductors 302b-d. If current in a first conductor (e.g. 302a) differs from current in a second conductor (e.g. 302b), voltages in the transformers 304 will oppose the current difference so that current in each of the conductors 302 are typically equal.

For an ideal example, if the current in the first conductor 302a is A and the first conductor 302a passes through the ferrite structure of the first transformer 304a and the current loop 306 has 20 windings around the ferrite structure then the current in the current loop is A/20. If the current in the second conductor 302b is B and passes through the ferrite structure of the second transformer 304b and the current loop 306 has 20 windings then the current in the current loop is B/20. Likewise, if the current loop 306 has 20 windings around the third and fourth transformers 304c, 304d with the third conductor 302c and fourth conductor 302d then current in the third conductor 302c is C so the current in the current loop 306 is C/20 and current in the fourth conductor 302d is D so the current in the current loop 306 is D/20. However, the current in the current loop is the same through the four transformers 304a-d so A/20=B/20=C/20=D/20 then A=B=C=D so current in the four conductors 302a-d is the same.

As used herein, maintaining equal current sharing includes currents in conductors that are substantially equal but may have minor differences. One of skill in the art will recognize that minor differences between the transformers, less than ideal magnetic coupling, etc. may result in minor differences between the currents in the four conductors 302a-d. However, current sharing using the four current transformers 304a-d and current loop 306 provides for substantially similar power being provided to the primary pads 1126a-d. For example, where power sharing between primary pads 126a-d without transformers includes differences on the order of 10-30%, inclusion of the transformers 304a-d may reduce the differences significantly, for example to around 0-10%. While the example of FIG. 2 depicts four resonant converters 118 and primary pads 126 in parallel, one of skill in the art that the equal current sharing concept is equally applicable to more or less resonant converters 118 and primary pads 126 in parallel.

Figure 4:
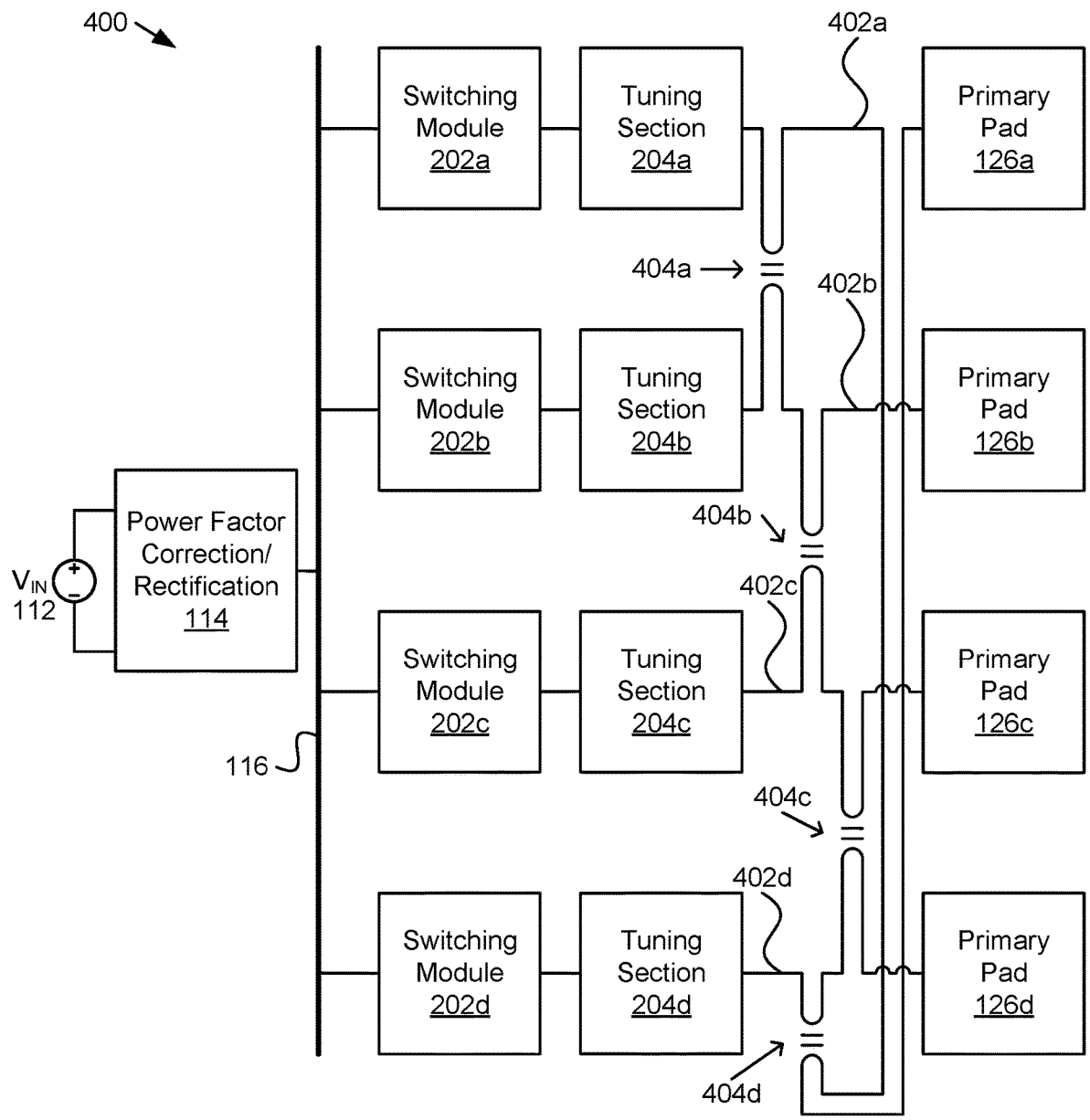
FIG. 4 is a schematic block diagram illustrating one embodiment of four resonant converters and primary pads in parallel with one embodiment of a current sharing apparatus with four transformers interconnecting conductors of the resonant converters with primary pads.

FIG. 4 is a schematic block diagram illustrating one embodiment 400 of four resonant converters 118 and primary pads 126 in parallel with one embodiment of a current sharing apparatus with four transformers 404a-d (generically or collectively "304") interconnecting conductors 402a-d (genetically or collectively "402") of the resonant converters 118 with one or more primary pads 126. A first conductor 402a connects a first tuning section 204a to a first primary pad 126a. A second conductor 402b connects a second tuning section 204b to a second primary pad 126b. A third conductor 402c connects a third tuning section 204c to a third primary pad 126c. A fourth conductor 402d connects a fourth tuning section 204d to a fourth primary pad 126d. In one embodiment, the primary pads 126 are magnetically coupled. In another embodiment, the tuning sections 204a-d feed a single primary pad 126. For example, each tuning section 204a-d may be connected to a different winding in the single primary pad 126.

In the example depicted in FIG. 4, the first conductor 402a and the second conductor 402b go through a first transformer 404a. Each transformer 404 includes a ferrite structure. The transformers 404a-d function in a similar way to the transformers 304a-d of the embodiment 300 of FIG. 3, but may be sized differently based on wire size differences or other differences. The first conductor 402a and the second conductor 402b pass through the ferrite structure of the first transformer 404a in such a way so that a current from the first tuning section 204a to the first primary pad 126a will compliment and not oppose current through the second conductor 402a from the second tuning section 204b to the second primary pad 126b. The first conductor 402a and the second conductor 402b have the same number of windings around the ferrite structure of the first transformer 404a to encourage current in the first conductor 402a to be the same as the current in the second conductor 402b. Minor variations may exist between the two currents due to component variations, imperfect coupling, etc.

The second conductor 402b and the third conductor 402c pass through the second transformer 404b. The third conductor 402c and the fourth conductor 402d pass through the third transformer 404c. The fourth conductor 402d and the first conductor 402d pass through the fourth transformer 404d. Thus, ideally the current through the second conductor 402b equals the current through the third conductor 402c, current through the third conductor 402c equals the current through the fourth conductor 402d, and current through the fourth conductor 402d equals current through the first conductor 402a.

Where a switching module (e.g. 202a), tuning section (e.g. 204a) and a primary pad (e.g. 126a) attempt to operate with a current in a conductor (e.g. 402a) between the tuning section 204a and primary pad 126a different than other conductors 402b-d, the transformers (e.g. 404a, 404d) through which the first conductor 402a passes will oppose the different current and will urge the current in the first conductor 402a to equal the currents in the other conductors 402b-d. While transformers 304a-d are not depicted between the switching modules 202a-d and tuning sections 204a-d as in FIG. 3, in another embodiment the transformers 304a-d as in the embodiment 300 of FIG. 3 may also be included along with the transformers 404a-d in the embodiment 400 of FIG. 4.

One of skill in the art will recognize that minor variations may exist between the currents due to component variations and other conditions. While the example in FIG. 4 depicts four resonant converters 118 and primary pads 126 in parallel, the equal current sharing technique is equally applicable to more or less parallel resonant converters 118. In addition, the technique depicted in the embodiment 400 of FIG. 4 may be used elsewhere, such as between the switching modules 202a-d and tuning sections 204a-d.

Figure 5:
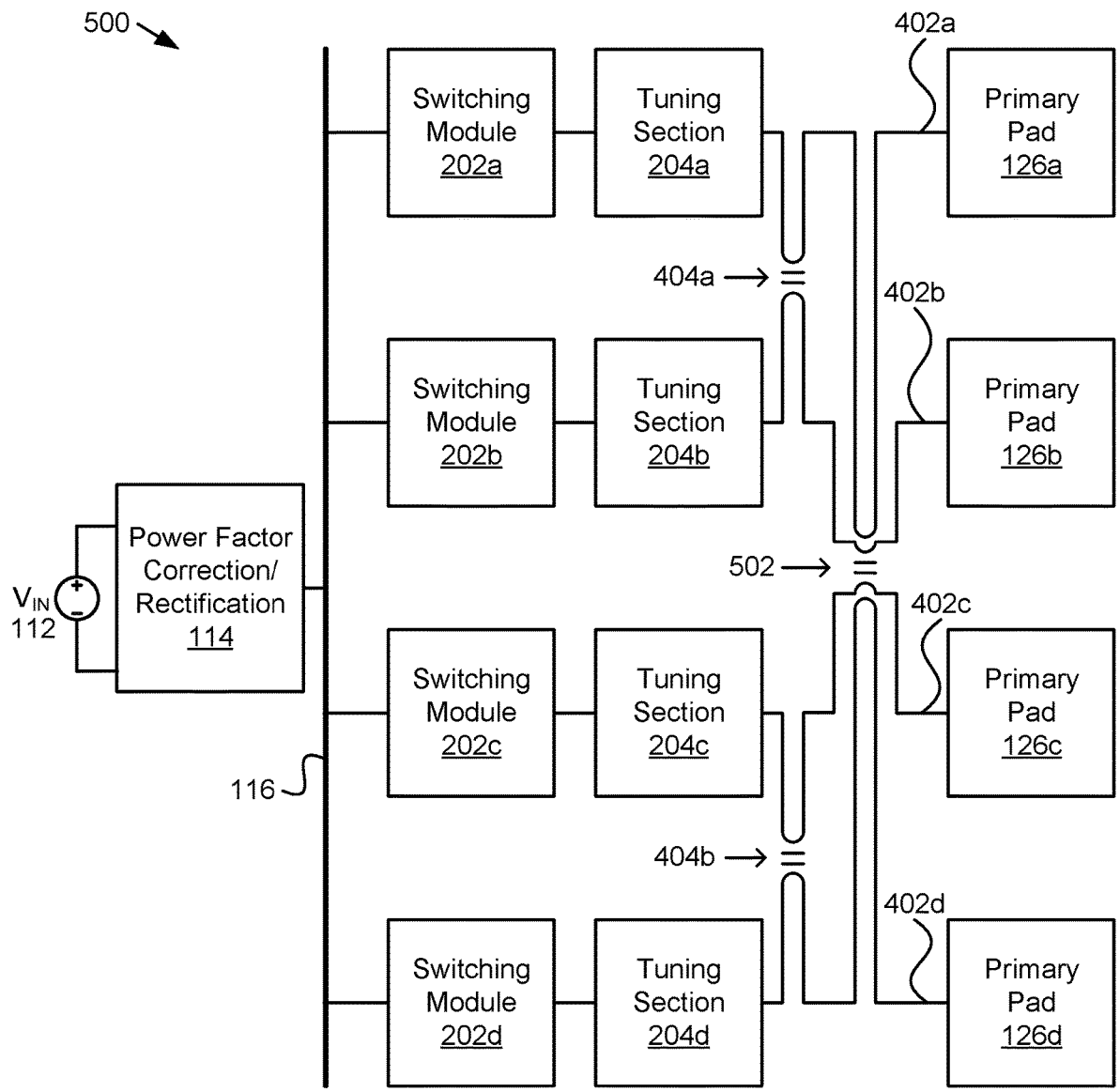
FIG. 5 is a schematic block diagram illustrating one embodiment of four resonant converters and primary pads in parallel with one embodiment of a current sharing apparatus with three transformers interconnecting conductors of the resonant converters with primary pads.

FIG. 5 is a schematic block diagram illustrating one embodiment 500 of four resonant converters 118 and primary pads 126 in parallel with one embodiment of a current sharing apparatus with three transformers interconnecting conductors of the resonant converters 118 to the primary pads 126. A first conductor 402a connects a first tuning section 204a to a first primary pad 126a. A second conductor 402b connects a second tuning section 204b to a second primary pad 126b. A third conductor 402c connects a third tuning section 204c to a third primary pad 126c. A fourth conductor 402d connects a fourth tuning section 204d to a fourth primary pad 126d. In one embodiment, the primary pads 126 are magnetically coupled. In another embodiment, the tuning sections 204a-d feed a single primary pad 126. For example, each tuning section 204a-d may be connected to a different winding in the single primary pad 126.

In the example depicted in FIG. 5, the first conductor 402a and the second conductor 402b go through a first transformer 404a. Each transformer 404 includes a ferrite structure. The transformers 404a-d function in a similar way to the transformers 304a-d of the embodiment 300 of FIG. 3, but may be sized differently based on wire size differences or other differences. The first conductor 402a and the second conductor 402b pass through the ferrite structure of the first transformer 404a in such a way so that a current from the first tuning section 204a to the first primary pad 126a will compliment and not oppose current through the second conductor 402a from the second tuning section 204b to the second primary pad 126b. The first conductor 402a and the second conductor 402b have the same number of windings around the ferrite structure of the first transformer 404a to encourage current in the first conductor 402a to be the same as the current in the second conductor 402b. Minor variations may exist between the two currents due to component variations, imperfect coupling, etc.

The third conductor 402c and the fourth conductor 402d pass through a second transformer 404b. The operation of the second transformer 404b with regard to the currents in the third conductor 402c and fourth conductor 402d is similar to the operation of the first transformer 404a with regard to the first conductor 402a and second conductor 402b. Thus, the current through the first conductor 402a and the current through the second conductor 402b are equal and the current through the third conductor 402c and the current through the fourth conductor 402d are equal.

A common transformer 502 includes the first conductor 402a, the second conductor 402b, the third conductor 402c and the forth conductor 402d and is sized appropriately for the four conductors 402a-d. The first and second conductors 402a, 402b are treated as a single conductor and the third and fourth conductors 402c, 402d are treated as a single conductor. The third and fourth conductors 402c, 402d pass through a ferrite structure of the common transformer 502 in a direction not to oppose the currents in the first and second conductors 402a, 402b. The currents in the four conductors 402a-d may be labeled A, B, C and D so A=B and C=D. With regard to the common transformer 502, A+B=C+D so that A=B=C=D. Thus, ideally the currents in the four conductors 402a-d are equal. As with the previous examples listed above, the currents in the four conductors 402a-d may differ slightly due to component variations, layout, etc. In addition, transformers 304a-d between the switching modules 202a-d and the tuning sections 204a-d as depicted in the embodiment of FIG. 3 may also be included. In another embodiment, the equal current sharing method of the embodiment 500 of FIG. 5 may be located in other locations, such as between the switching modules 202a-d and the tuning sections 204a-d. The number of paralleled resonant converters 118 may also change, for example to eight and the number and configuration of the transformers may vary to achieve the same results.

Figure 6:
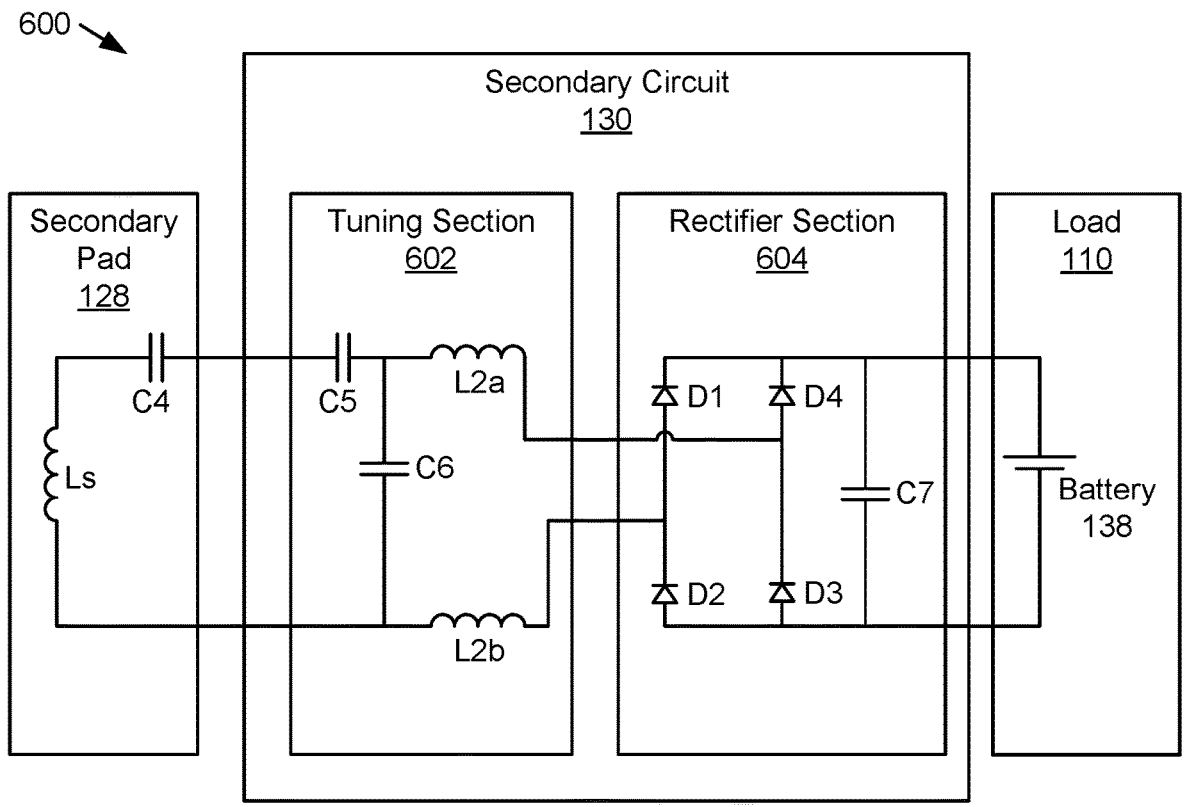
FIG. 6 is a schematic block diagram illustrating one embodiment of a secondary circuit feeding a load.

FIG. 6 is a schematic block diagram illustrating one embodiment 600 of a secondary circuit 130 feeding a load 110. A secondary pad 128 feeds a tuning section 602 within the secondary circuit 130 and the tuning section 602 feeds a rectifier section 604 in the secondary circuit 130, which feeds a load 110.

The secondary pad 128 includes one or more windings arranged to receive power from a primary pad 126. The secondary pad 128 may include a ferrite structure and windings arranged in a pattern that efficiently receives power from the primary pad 126. In one embodiment, the secondary pad 128 mirrors the primary pad 126 transmitting power. In another embodiment, the secondary pad 128 differs from the primary pad 126. Typically, the secondary pad 128 includes an inductance Ls formed as a result of the windings and the ferrite structure of the secondary pad 128. In one embodiment, the secondary pad 128 includes a capacitor C4.

The tuning section 602 includes one or more capacitors C5, C6 and inductors L2a, L2b that are arranged to form a resonant circuit with the secondary pad 128 with a resonant frequency. In some embodiments, capacitor C6 is not present. In one embodiment, the resonant frequency matches a resonant frequency of the primary pad 126 transmitting power. Typically, a resonant frequency is formed between the inductor Ls of the secondary pad 128 and series capacitors C4 and C5 of the secondary pad 128 and/or tuning section 602. In some embodiments, the secondary pad 128 or the tuning section 602 include a single series capacitor C4 or C5. Other capacitors (e.g. C6) and inductors (e.g. L2a, L2b) may form a low pass filter to reduce voltage ripple at the resonant frequency. In other embodiments, a low-pass filter is included after rectification elements in the rectifier section 604. For example, a capacitor C7 may be included. One of skill in the art will recognize other configurations of the tuning section 602 that form a resonant tank with the secondary pad 128 and pass energy to the rectifier section 604.

A rectifier section includes diodes, switches, or other rectification elements to convert alternating current ("AC") power to direct current ("DC") power. The rectifier section 604 depicted in FIG. 6 includes a full bridge rectifier with four diodes D1-D4. In some embodiments, the diodes D1-D4 are replaced with active elements, such as switches, which may be used to reduce harmonics, reduce power consumption, and the like.

The load 110, in one embodiment is a battery 138. In other embodiments, the load 110 may include other components, such as a motor, a resistive load, electronics, and the like. In one embodiment, the secondary pad 128, secondary circuit 130 and load 110 are part of a vehicle 140. In other embodiments, the secondary pad 128, secondary circuit 130 and load 110 are part of a computing device, a smartphone, and the like.

Figure 7:
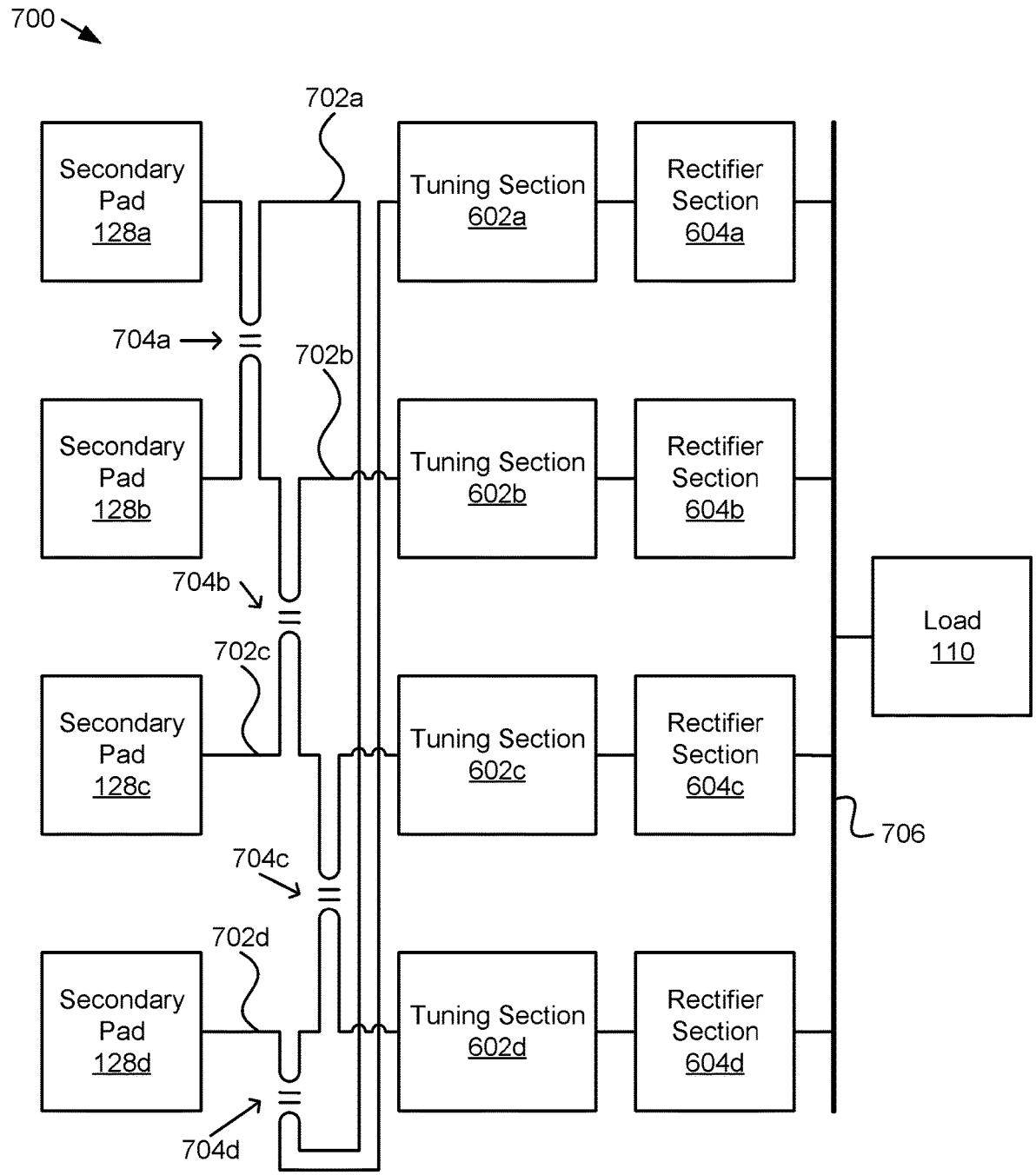
FIG. 7 is a schematic block diagram illustrating one embodiment of four secondary pads and secondary circuits in parallel feeding a load with a current sharing apparatus with four transformers interconnecting conductors of the secondary pads and the secondary circuits.

FIG. 7 is a schematic block diagram illustrating one embodiment 700 of four secondary pads 128 and secondary circuits 130 in parallel feeding a load 110 with a current sharing apparatus with four transformers 704 interconnecting conductors of the secondary pads 126 and the secondary circuits 130. The rectifier sections 604 feed a single load 110 through a DC bus 706. In another embodiment, there is a single secondary pad 128. In a further embodiment, the single secondary pad 128 includes parallel windings and each tuning section 602 is connected to a winding. One of skill in the art will recognize other ways to parallel secondary circuits 130.

As with the examples in FIGS. 3-5, the embodiment 700 depicted in FIG. 7 is a one line diagram and the conductors between elements represent multiple conductors. For example, the first conductor 702a between the first secondary pad 128a and the first tuning section 602a may be a line conductor or return conductor and the current sharing method described with regard to FIG. 7 is equally applicable to either conductor. In addition, the equal current sharing method of the embodiment 700 of FIG. 7 may be located between the tuning sections 602a-d and the rectifier sections 604a-d.

The first conductor 702a between the first secondary pad 128a and the first tuning section 602a and the second conductor 702b between the second secondary pad 128b and the second tuning section 602b pass through a first transformer 704a. The transformers depicted 704a-d are substantially similar to the transformers 304, 404 depicted with regard to the embodiments 300, 400, 500 of FIGS. 3, 4 and 5. The second conductor 702b and the third conductor 702c pass through the second transformer 704b. The third conductor 702c and the fourth conductor 702d pass through the third transformer 704c. The fourth conductor 702d and the first conductor 702a pass through the fourth transformer 704d. If the currents in the four conductors 702a-d are A, B, C, and D then ideally A=B, B=C, C=D, D=A so A=B=C=D. As mentioned above, component variations, layout differences, imperfect coupling, etc. may contribute to minor differences between the currents.

Figure 8:
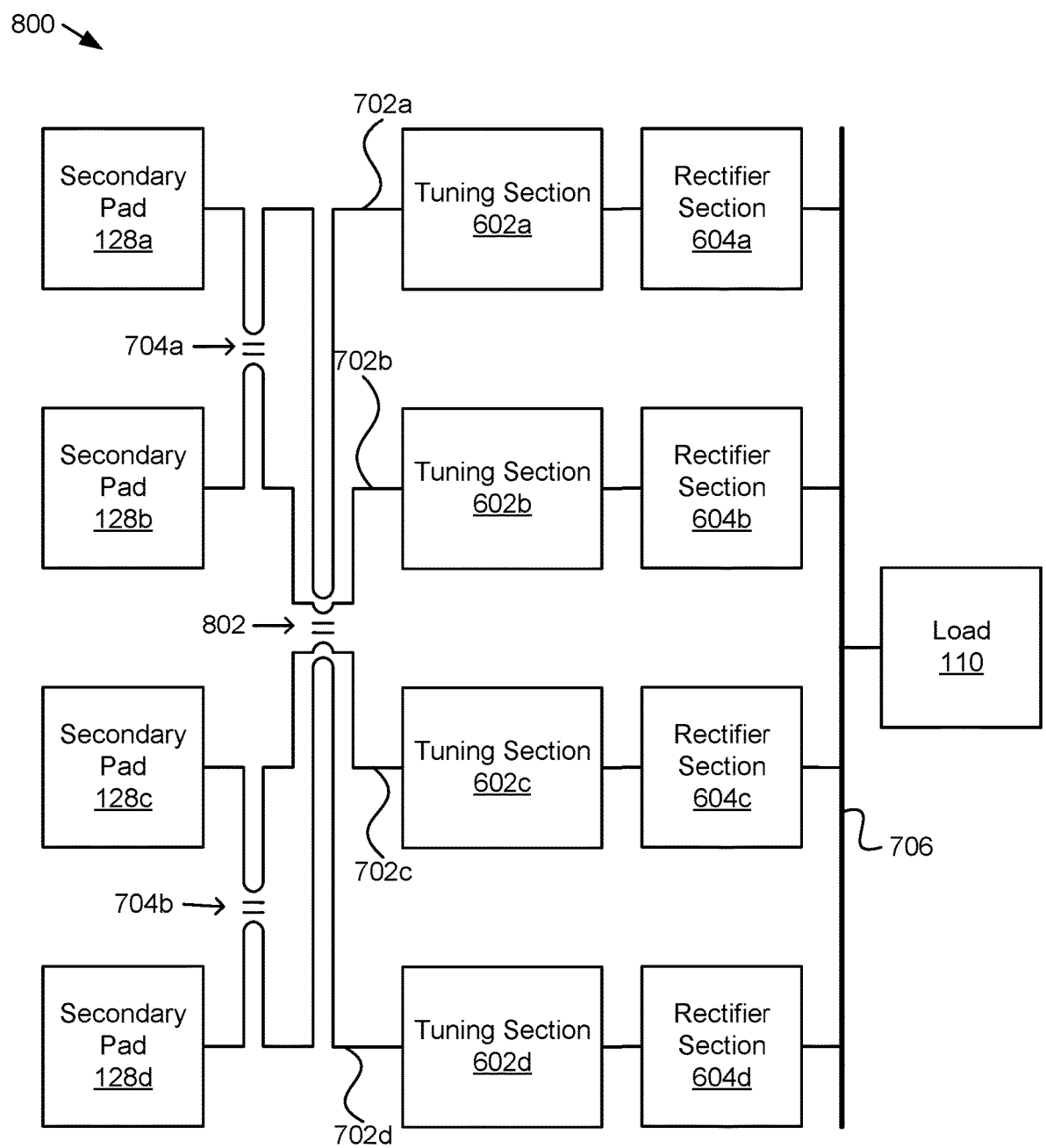
FIG. 8 is a schematic block diagram illustrating one embodiment of four secondary pads and secondary circuits in parallel feeding a load with a current sharing apparatus with three transformers interconnecting conductors of the secondary pads and the secondary circuits.

FIG. 8 is a schematic block diagram illustrating one embodiment 800 of four secondary pads 128 and secondary circuits 130 in parallel feeding a load 110 with a current sharing apparatus with three transformers 704 interconnecting conductors 702 of the secondary pads 128 and the secondary circuits 130. The rectifier sections 604 feed a single load 110 through a DC bus 706. A first conductor 702a connects a first secondary pad 128a to a first tuning section 602a feeding the load 110 through a first rectifier section 604a and the DC bus 706. A second conductor 702b connects a second secondary pad 128b to a second tuning section 602b feeding a load 110 through a second rectifier section 604b and the DC bus 706. A third conductor 702c connects a third secondary pad 128c to a third tuning section 602c feeding the load 110 through a third rectifier section 604c and the DC bus 706. A fourth conductor 702d connects a fourth secondary pad 128d to a fourth tuning section 602d feeding the load 110 through a fourth rectifier section 604d and the DC bus 706. In one embodiment, the secondary pads 128 are magnetically coupled. In another embodiment, the tuning sections 602a-d are fed from a single secondary pad 128. For example, each tuning section 602a-d may be connected to a different winding in the single secondary pad 128.

In the example depicted in FIG. 8, the first conductor 702a and the second conductor 702b go through a first transformer 704a. Each transformer 704 includes a ferrite structure. The first conductor 702a and the second conductor 702b pass through the ferrite structure of the first transformer 704a in such a way so that a current from the first secondary pad 128a to the first tuning section 602a will compliment and not oppose current through the second conductor 702a from the second secondary pad 128b to the second tuning section 602b. The first conductor 702a and the second conductor 702b have the same number of windings around the ferrite structure of the first transformer 704a to encourage current in the first conductor 702a to be the same as the current in the second conductor 702b. Minor variations may exist between the two currents due to component variations, imperfect coupling, etc.

The third conductor 702c and the fourth conductor 702d pass through a second transformer 704b. The operation of the second transformer 704b with regard to the currents in the third conductor 702c and fourth conductor 702d is similar to the operation of the first transformer 704a with regard to the first conductor 702a and second conductor 702b. Thus, the current through the first conductor 702a and the current through the second conductor 702b are equal and the current through the third conductor 702c and the current through the fourth conductor 702d are equal.

A common transformer 802 includes the first conductor 702a, the second conductor 702b, the third conductor 702c and the fourth conductor 702d and is sized appropriately for the four conductors 702a-d. The first and second conductors 702a, 702b are treated as a single conductor and the third and fourth conductors 702c, 702d are treated as a single conductor. The third and fourth conductors 702c, 702d pass through a ferrite structure of the common transformer 802 in a direction not to oppose the currents in the first and second conductors 702a, 702b. The currents in the four conductors 702a-d may be labeled A, B, C and D so A=B and C=D. With regard to the common transformer 802, A+B=C+D so that A=B=C=D. Thus, ideally the currents in the four conductors 702a-d are equal. As with the previous examples listed above, the currents in the four conductors 702a-d may differ slightly due to component variations, layout, etc. The number of paralleled secondary circuits 130 may also change, for example to eight and the number and configuration of the transformers may vary to achieve the same results. The equal current sharing method of the embodiment 800 of FIG. 8 may be located between the tuning sections 602a-d and the rectifier sections 604a-d.

Figure 9:
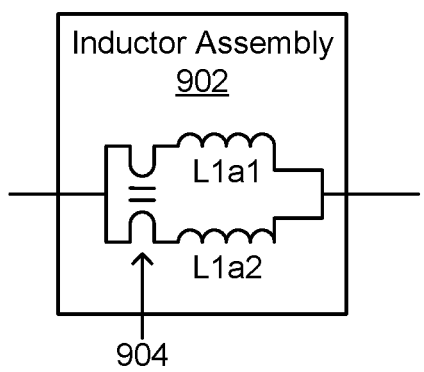
FIG. 9 is a schematic block diagram illustrating one embodiment of an inductor assembly with two inductors and a current sharing apparatus.

FIG. 9 is a schematic block diagram illustrating one embodiment of an inductor assembly 902 with two inductors L1a1, L1a2 and a current sharing apparatus. The inductor assembly 902 may be an inductor in the resonant converter (e.g. L1a or L1b), in the secondary circuit 130 (e.g. L2a, L2b) or other location within the WPT system 100. The current sharing apparatus includes a transformer 904 with conductors leading to the inductors L1a1, L1a2 passing through the transformer 904. The transformer 904 includes a ferrite structure where the conductors pass through the ferrite structure. The ferrite structure of the transformer 904 may be a torpid or similar structure and the transformer 904 may be similar to the transformers 304a-d, 404a-d, 704a-d as described above. Due to variations within the inductors L1a1, L1a2, without the transformer 904, the current through each of the inductors L1a1, L1a2 may vary. Beneficially, the transformer 904 increases equal current sharing between the inductors L1a1, L1a2, which may help to prevent one inductor from becoming overheated, etc.

Figure 10:
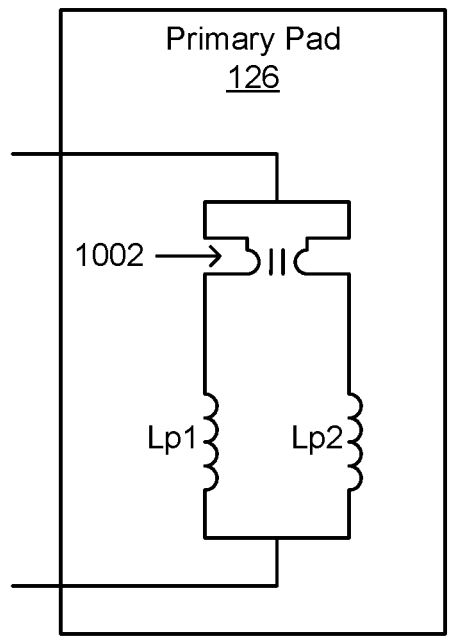
FIG. 10 is schematic block diagram illustrating one embodiment of a primary pad with two windings and a current sharing apparatus.

FIG. 10 is schematic block diagram illustrating one embodiment of a primary pad 126 with two windings and a current sharing apparatus. The current sharing apparatus may be used with a secondary pad 128. In some embodiments, the primary pad 126 and/or secondary pad 128 includes multiple windings connected in parallel. Parallel windings are advantageous to reduce voltage of the pad 126, 128. Two windings are depicted in FIG. 10, characterized by two inductances Lp1 and Lp2, but one of skill in the art will recognize that three, four or more windings can be connected in parallel. Using parallel windings is discussed in more detail in U.S. Patent Publication No. 2016/0380469, filed Jun. 6, 2016 for Patrice Lethellier, et, al., which is incorporated herein by reference for all purposes.

The primary pad 126 includes a transformer 1002 where the windings pass through a ferrite structure of the transformer 1002. As with other transformers 304a-d, 404a-d, 704a-d, 904 discussed above, the windings pass through the ferrite structure to increase equal current sharing between the windings. The windings may vary in length, layout, etc. and may naturally have unequal current sharing. The transformer 1002 helps to maintain equal sharing between the windings.

Figure 11:
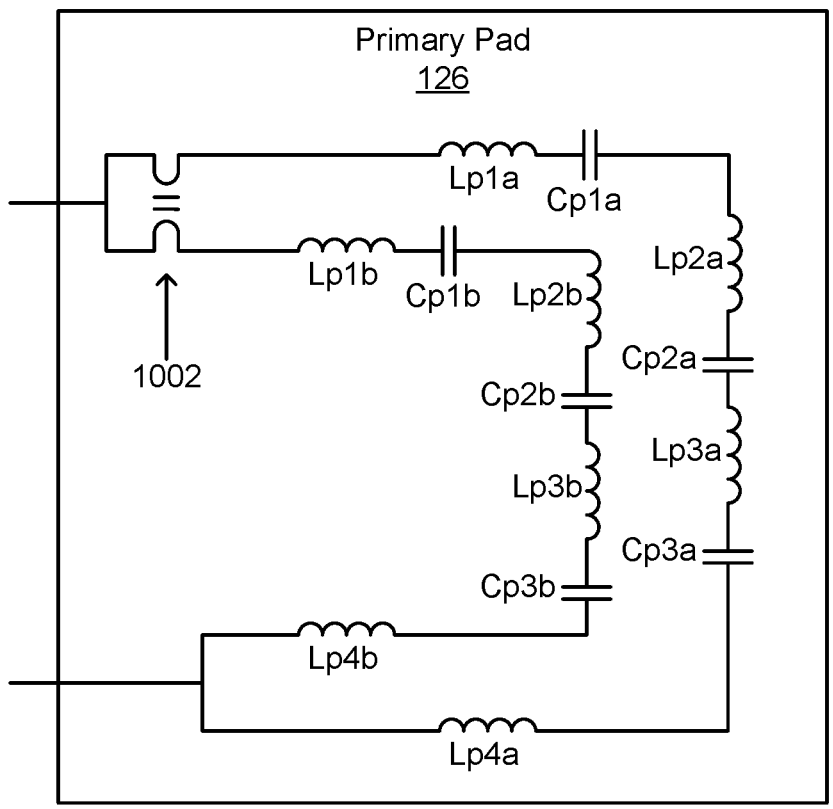
FIG. 11 is schematic block diagram illustrating another embodiment of a primary pad with two windings and a current sharing apparatus.

FIG. 11 is schematic block diagram illustrating another embodiment of a primary pad 126 with two windings and a current sharing apparatus. As with the primary pad 126 of FIG. 10, the current sharing apparatus may be used for a primary pad 126 or a secondary pad 128. In some embodiments, the primary pad 126 and/or secondary pad 128 includes multiple windings connected in parallel. Parallel windings are advantageous to reduce voltage of the pads 126, 128. Having capacitors Cp1a, Cp2a, Cp3a, Cp1b, Cp2b, Cp3b interleaved with the windings Lp1a, Lp2a, Lp3a, Lp4a, Lp1b, Lp2b, Lp3b, Lp4b further reduces voltage of the pads 126, 128. Two windings are depicted in FIG. 11, but one of skill in the art will recognize that three, four or more windings can be connected in parallel. Using parallel windings with interleaved capacitors is discussed in more detail in U.S. patent application Ser. No. 62/544,988, filed Aug. 14, 2017 for Patrice Lethellier, et. al., which is incorporated herein by reference for all purposes.

The primary pad 126 includes a transformer 1002 where the windings pass through a ferrite structure of the transformer 1002. As with other transformers 304a-d, 404a-d, 704a-d, 904, 1002 discussed above, the windings pass through the ferrite structure to increase equal current sharing between the windings. The windings may vary in length, layout, etc. and may naturally have unequal current sharing. The transformer 1002 helps to maintain equal sharing between the windings. Where three or more windings are used, additional transformers 1002 may also be used for equal current sharing, for example using the design of FIGS. 3-5, 7, 8 may be used.

Figure 12:
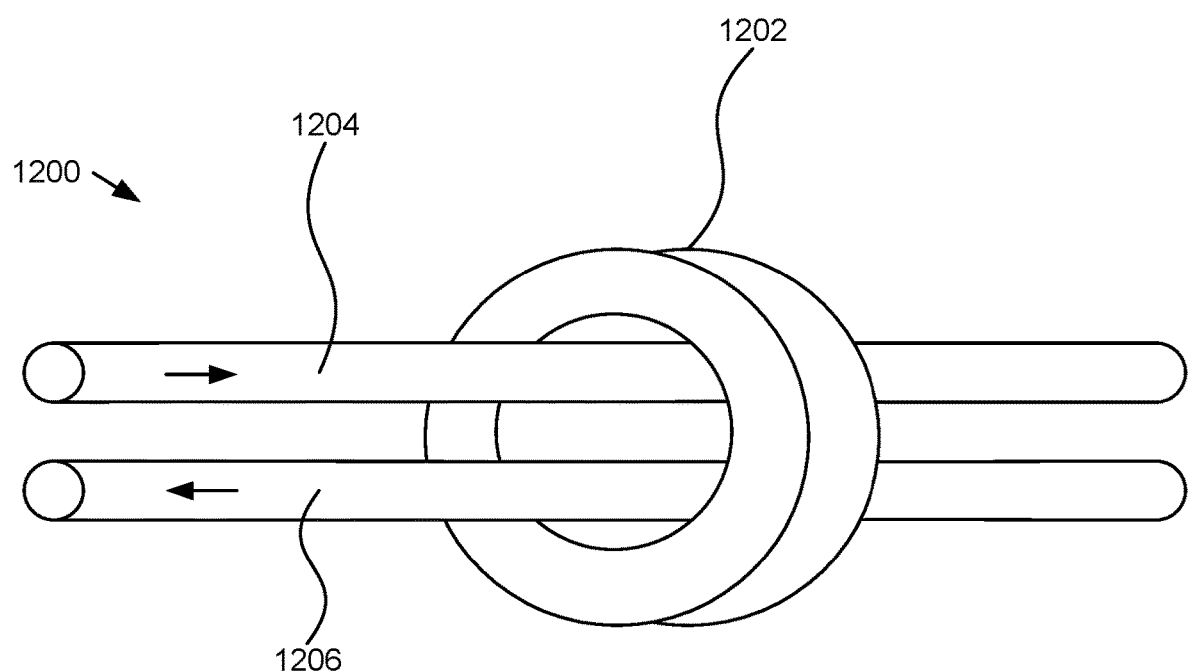
FIG. 12 is a schematic block diagram illustrating one embodiment of a current sharing apparatus in the form of a transformer with a toroid and two conductors.

FIG. 12 is a schematic block diagram illustrating one embodiment of a current sharing apparatus 1200 in the form of a transformer with a toroid 1202 and two conductors 1204, 1206. Arrows indicate direction of current flow and conductors from paralleled components may be routed for the current to flow in the directions indicated. The current sharing apparatus 1200 includes conductors 1204, 1206 that pass through the toroid 1202 a single time, In other embodiments, the conductors wind around the toroid 1202 "n" times. Where the conductors 1204, 1206 are from paralleled components, the conductors 1204, 1206 are typically wound with an equal number of turns. Where a current loop is used, such as the current loop 206 in FIG. 3, the current loop may include more turns than the conductors of paralleled components. While a toroid 1202 is depicted, other ferrite structures may be used, such as a square core, a rectangular core, or other ferrite structure known to those of skill in the art. The ferrite structure may be chosen based on area of an opening in the ferrite structure, amount of current, etc. and designed to prevent saturation, to minimize losses, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   two or more power converter apparatuses, each power converter apparatus connected to a primary wireless power transfer ("WPT") pad; and one or more ferrite structures, wherein each ferrite structure comprises a conductor of at least one power converter apparatus of the two or more power converter apparatuses passing through the ferrite structure and each ferrite structure comprises two or more conductors, wherein the conductors passing through a ferrite structure of the one or more ferrite structures are arranged to maintain equal current sharing between the conductors passing through the ferrite structure.

2. The apparatus of claim 1, wherein a ferrite structure of the one or more ferrite structures and two or more conductors passing through the ferrite structure form a transformer.

3. The apparatus of claim 1, wherein each ferrite structure of the one or more ferrite structures comprises a toroid, the toroid comprising a ferromagnetic material.

4. The apparatus of claim 1, wherein the two or more power converter apparatuses comprise resonant converters and each resonant converter comprises a switching section and a tuning section, wherein a conductor in a current path common with the switching section and the tuning section of a resonant converter passes through a ferrite structure of the one or more ferrite structures.

5. The apparatus of claim 4, wherein each tuning section comprises at least one inductor assembly comprising an inductance, wherein the inductor assembly comprises two or more inductors connected in parallel and further comprising one or more current sharing ferrite structures for the inductor assembly, wherein a conductor of each inductor passes through at least one of the current sharing ferrite structures of the inductor assembly in an arrangement to maintain equal current sharing between the inductors.

6. The apparatus of claim 1, wherein the two or more power converter apparatuses comprise two power converter apparatuses and the one or more ferrite structures comprise one ferrite structure and a conductor of each of the power converter apparatuses passes through the ferrite structure in an arrangement to maintain equal current sharing between the power converter apparatuses.

7. The apparatus of claim 1, wherein the two or more power converter apparatuses comprise four power converter apparatuses and the one or more ferrite structures comprise four ferrite structures and wherein:
   a conductor of each of a first and a second power converter apparatus pass through a first ferrite structure;
   a conductor of each of the second and a third power converter apparatus pass through a second ferrite structure;
   a conductor of each of the third and a fourth power converter apparatus pass through a third ferrite structure; and
   a conductor of each of the fourth and the first power converter apparatus pass through a fourth ferrite structure,
   wherein the conductors and ferrite structures are arranged to maintain equal current sharing between the four power converter apparatuses.

8. The apparatus of claim 1, wherein the two or more power converter apparatuses comprise four power converter apparatuses and the one or more ferrite structures comprise three ferrite structures and wherein:
   a conductor of each of a first and a second power converter apparatus pass through a first ferrite structure;
   a conductor of each of a third and a fourth power converter apparatus pass through a second ferrite structure; and
   a conductor of each of the first, the second, the third and the fourth power converter apparatus pass through a third ferrite structure,
   wherein the conductors and ferrite structures are arranged to maintain equal current sharing between the four power converter apparatuses.

9. The apparatus of claim 1, wherein the apparatus comprises an equal number of power converter apparatuses and ferrite structures and each of the two or more power converter apparatuses comprises a conductor passing through a ferrite structure and further comprising an additional conductor that passes through each ferrite structure of the two or more ferrite structures, wherein the conductors of the two or more power converter apparatuses, the additional conductor and the ferrite structures are arranged to maintain equal current sharing between the two or more power converter apparatuses.

10. The apparatus of claim 9, wherein the additional conductor comprises n turns around each of the ferrite structures and each conductor of the two or more power converter apparatuses passing through the ferrite structure comprise m turns around the ferrite structure, wherein n is greater than m resulting in less current through the additional conductor than the currents of the conductor of the power converter apparatus passing through the ferrite structures.

11. The apparatus of claim 1, wherein the primary WPT pad comprises two or more windings arranged in parallel and further comprising one or more current sharing ferrite structures in addition to a pad ferrite structure of the primary WPT pad, wherein the one or more current sharing ferrite structures are arranged with at least one winding passing through each of the one or more current sharing ferrite structures to maintain equal current sharing between the windings.

12. The apparatus of claim 1, wherein the conductors passing through a ferrite structure of the one or more ferrite structures for equal power sharing each comprise an equal number of turns around the ferrite structure.

13. An apparatus comprising:
   two or more power converter apparatuses, each power converter apparatus connected to a primary wireless power transfer ("WPT") pad, each converter apparatus comprising a resonant converter and a switching section; and
   one or more ferrite structures, wherein each ferrite structure comprises a conductor of at least one power converter apparatus of the two or more power converter apparatuses passing through the ferrite structure, wherein the conductors passing through a ferrite structure of the one or more ferrite structures are arranged to maintain equal current sharing between the conductors passing through the ferrite structure,
   wherein each ferrite structure of the one or more ferrite structures comprises a toroid, the toroid comprising a ferromagnetic material, and
   wherein at least one ferrite structure of the one or more ferrite structures comprises conductors passing through the ferrite structure from two or more different power converter apparatuses and the conductors passing through the ferrite structure are arranged to maintain equal current sharing between the power converter apparatuses.

14. An apparatus comprising:
   two or more secondary circuits, each secondary circuit comprising a rectifier section, each secondary circuit connected to a secondary wireless power transfer ("WPT") pad that receives power wirelessly; and one or more ferrite structures, wherein each ferrite structure comprises a conductor of at least one secondary circuit of the two or more secondary circuits passing through the ferrite structure, wherein the conductors passing through a ferrite structure of the one or more ferrite structures are arranged to maintain equal current sharing between the conductors passing through the ferrite structure.

15. The apparatus of claim 14, wherein the two or more secondary circuits feed a common load.

16. The apparatus of claim 14, wherein a conductor of each of a first and a second secondary circuits of the two or more secondary circuits pass through a common ferrite structure, wherein the conductors and ferrite structure are arranged to maintain equal current sharing between the first and the second secondary circuits.

17. The apparatus of claim 14, wherein each secondary circuit comprises a tuning section connected to the rectifier section of the secondary circuit, wherein each tuning section of a secondary circuit is positioned between the rectifier section of the secondary circuit and the secondary WPT pad feeding the secondary circuit, wherein a conductor of a current path between the WPT secondary pad feeding a secondary circuit and a tuning section of the secondary circuit passes through a ferrite structure of the one or more ferrite structures in an arrangement to maintain equal current sharing between the secondary circuits.

18. The apparatus of claim 14, wherein the two or more secondary circuits comprise four secondary circuits and the one or more ferrite structures comprise four ferrite structures and wherein:

a conductor of each of a first and a second secondary circuit pass through a first ferrite structure;

a conductor of each of the second and a third secondary circuit pass through a second ferrite structure;

a conductor of each of the third and a fourth secondary circuit pass through a third ferrite structure; and a conductor of each of the fourth and the first secondary circuit pass through a fourth ferrite structure, wherein the conductors and ferrite structures are arranged to maintain equal current sharing between the four secondary circuits.

19. The apparatus of claim 14, wherein the two or more secondary circuits comprise four secondary circuits and the one or more ferrite structures comprise three ferrite structures and wherein:

a conductor of each of a first and a second secondary circuit pass through a first ferrite structure;

a conductor of each of a third and a fourth secondary circuit pass through a second ferrite structure; and a conductor of each of the first, the second, the third and the fourth secondary circuit pass through a third ferrite structure, wherein the conductors and ferrite structures are arranged to maintain equal current sharing between the four secondary circuits.

20. The apparatus of claim 14, wherein the two or more secondary circuits comprise two secondary circuits and the one or more ferrite structures comprise one ferrite structure and a conductor of each of the secondary circuits passes through the ferrite structure in an arrangement to maintain equal current sharing between the secondary circuits.

* * * * *